United States Patent
Jung et al.

(10) Patent No.: US 7,637,648 B2
(45) Date of Patent: Dec. 29, 2009

(54) PORTABLE DISPLAY DEVICE

(75) Inventors: Youn Hwan Jung, Ulsan-si (KR); Mun Hee Lee, Ulsan-si (KR); Jae Mo Chung, Ulsan-si (KR)

(73) Assignee: Samsung Mobile Display Co., Ltd., Yongin, Gyunggi-Do (KR)

( * ) Notice: Subject to any disclaimer, the term of this patent is extended or adjusted under 35 U.S.C. 154(b) by 367 days.

(21) Appl. No.: 11/648,612

(22) Filed: Jan. 3, 2007

(65) Prior Publication Data

US 2007/0201248 A1    Aug. 30, 2007

(30) Foreign Application Priority Data

Feb. 28, 2006  (KR) .................. 10-2006-0019357
Mar. 29, 2006  (KR) .................. 10-2006-0028567

(51) Int. Cl.
    *F21V 33/00* (2006.01)
(52) U.S. Cl. .................. 362/616; 362/632; 362/631
(58) Field of Classification Search .................. 362/602, 362/616, 632–634, 630–631
    See application file for complete search history.

(56) References Cited

U.S. PATENT DOCUMENTS

| 2003/0112217 | A1 | 6/2003 | Lee |
| 2003/0227254 | A1 | 12/2003 | Terumoto |
| 2004/0062027 | A1* | 4/2004 | Kim et al. .................. 362/31 |
| 2004/0183434 | A1 | 9/2004 | Yeh et al. |
| 2004/0263064 | A1 | 12/2004 | Huang |
| 2005/0057149 | A1 | 3/2005 | Herranen et al. |
| 2005/0224844 | A1* | 10/2005 | Mizuguchi .................. 257/233 |
| 2006/0114692 | A1* | 6/2006 | Han et al. .................. 362/616 |
| 2006/0232204 | A1 | 10/2006 | Hu |
| 2007/0080629 | A1 | 4/2007 | Ko |
| 2007/0164665 | A1 | 7/2007 | Hu |
| 2008/0084159 | A1 | 4/2008 | Fery et al. |
| 2008/0266490 | A1 | 10/2008 | Mizuki et al. |

FOREIGN PATENT DOCUMENTS

| JP | 10-208884 | 8/1998 |
| JP | 2004-258450 | 9/2004 |
| JP | 2005-265924 | 9/2005 |
| KR | 10-2004-0042249 | 5/2004 |

OTHER PUBLICATIONS

European Search Report issued on May 10, 2007, corresponding to European Patent Application No. 07101872.5-2205.

* cited by examiner

*Primary Examiner*—Laura Tso
(74) *Attorney, Agent, or Firm*—Robert E. Bushnell, Esq.

(57) ABSTRACT

A portable display device minimizes protrusions of a light emitting display panel, such as an organic light emitting display panel, and an integrated circuit to allows the thickness thereof to be reduced. The portable display device includes a light emitting display panel, such as an organic light emitting display panel. A metal plate is located on a rear surface of the organic light emitting display panel. A bottom chassis receives another light emitting display panel, such as a liquid crystal display panel and a backlight assembly. A first printed circuit board is located between the organic light emitting display panel and the bottom chassis. At least a part of either the organic light emitting display panel or the metal plate is arranged in opening portions of the bottom chassis and the first printed circuit board.

21 Claims, 2 Drawing Sheets

PORTABLE DISPLAY DEVICE

CLAIM OF PRIORITY

This application makes reference to, incorporates the same herein, and claims all benefits accruing under 35 U.S.C.§119 from applications for PORTABLE DISPLAY DEVICE earlier filed in the Korean Intellectual Property Office on 28 Feb. 2006 and there duly assigned Serial No. 10-2006-0019357, and for PORTABLE DISPLAY DEVICE earlier filed in the Korean Intellectual Property Office on 29 Mar. 2006 and there duly assigned Serial No. 10-2006-0028567.

BACKGROUND OF THE INVENTION

1. Field of the Invention

The present invention relates to a portable display device, and more particularly to a portable display device having a reduced thickness.

2. Description of the Related Art

Recently, various flat plate displays capable of reducing weight and volume that are disadvantages of Cathode Ray Tubes (CRTs) have been developed. Flat panel displays include Liquid Crystal Displays (LCDs), Field Emission Displays (FEDs), Plasma Display Panels (PDPs), and organic light emitting displays.

Because LCDs have advantages including small-size, light-weight and low-power requirements, they have come into the spotlight as a substitute for CRTs. Recently, LCDs have been mounted in portable devices, such as portable phones, Personal Digital Assistants (PDAs), monitors, and TVs.

FIG. 1 is an exploded perspective view of a conventional portable display device. FIG. 2 is a cross-sectional view of the portable display device of FIG. 1 taken along line A-A'. FIG. 1 and FIG. 2 show a dual type display device, which includes a liquid crystal display panel and an organic light emitting display panel.

With reference to FIG. 1 and FIG.2, the conventional portable display device 100 includes an organic light emitting display panel 110, a first printed circuit board 120, a second printed circuit board 130, a Liquid Crystal Display (LCD) panel 148, and a bottom chassis 140 for receiving a backlight assembly. A flexible printed circuit board 114 is located on one side of the organic light emitting display panel 110. An integrated circuit 116 is mounted on the flexible printed circuit board 114 and provides a drive signal to the organic light emitting display panel 110. The flexible printed circuit board 114 is mounted in such as way that a part thereof is bent.

A plurality of Organic Light Emitting Diodes (OLEDs) (not shown) are arranged in the organic light emitting display panel 110 in the form of a matrix. The OLEDs generate light of a predetermined luminance corresponding to a drive signal supplied thereto. In order to supply the drive signal, the flexible printed circuit board 114 is positioned on one side of the organic light emitting display panel 110, and the integrated circuit 116 is mounted on an upper portion of the flexible printed circuit board 114. One side of the flexible printed circuit board 114 is positioned on a lower side portion of the organic light emitting display panel 110 to be connected to the organic light emitting display panel 110. A pad portion (not shown) of the flexible printed circuit board 114 is connected to a first pad portion 122 of the first printed circuit board 120 by soldering. The flexible printed circuit board 114 has a laminate structure of at least two materials having different thicknesses. A lower layer of the flexible printed circuit board 114 is generally thicker than an upper layer thereof. Accordingly, upon soldering the flexible printed circuit board 114 and the first printed circuit board 120, a bad soldering joint can occur due to stepped portions according to directions of materials. In order to prevent an occurrence of the bad soldering joint, the upper layer having a small thickness should be jointed to the first printed circuit board 120. To do this, conventionally, after a part of the flexible printed circuit board 114 is bent and a pad portion of the flexible printed circuit board 114 contacts the first pad portion 122, soldering is performed. When the pad portion of the flexible printed circuit board 114 is joined to the first pad portion 122, control signals generated by the first printed circuit board 120 are transferred to an integrated circuit 116, which is mounted on the flexible printed circuit board 114. Then, the integrated circuit 116 generates and provides drive signals corresponding to the control signals to the organic light emitting display panel 110, with the result that the organic light emitting display panel 110 displays a predetermined image. A metal plate 112 is attached to a lower portion of the organic light emitting display panel 110, and protects the organic light emitting display panel 110 from the infiltration of moisture.

The first printed circuit board 120 receives a drive signal from a drive circuit (not shown) of a portable phone. To do this, the first printed circuit board 120 includes a portable phone connector 125. The portable phone connector 125 mates with another connector attached to a drive circuit of a portable phone, and receives a drive signal from the drive circuit of a portable phone. The first printed circuit board 120, having received the drive signal, generates various control signals corresponding to the drive signal. At least a part of the metal plate 112 is inserted into an opening portion, which is formed in a predetermined portion of the first printed circuit board 120.

The second printed circuit board 130 is connected to the first printed circuit board 120 through a second pad portion 132. Furthermore, the second printed circuit board 130 is connected to an integrated circuit and an OLED board (not shown) of the LCD panel 148, having layers 148a and 148b, through a flexible printed circuit board (not shown). The second printed circuit board 130 connected to the integrated circuit and the OLED board drives the integrated circuit and the OLED board according to the control signals from the first printed circuit board 120.

The bottom chassis 140 engages with a molded frame 141 included in a backlight assembly, and receives the LCD panel 148 and the backlight assembly. The LCD panel 148 displays a predetermined image corresponding to a drive signal supplied thereto. The backlight assembly supplies predetermined light to the LCD panel 148 so that the liquid crystal display panel can display an image. In order to do this, the backlight assembly includes a Light Emitting Diode (LED) board (not shown), a reflective plate 142, a light guide plate 144, and optical sheets 146. Light sources, such as Light Emitting Diodes (LEDs) are mounted on the LED board.

In the aforementioned conventional portable display device 100, it is necessary to reduce a total thickness of the display device in order to be easily carried. A protrusion of the OLED panel 110 is one factor that increases the thickness of the portable display device 100. The flexible printed circuit board 114 in which an integrated circuit 116 is mounted is bent and mounted. Accordingly, the integrated circuit 116 can protrude. This can be a factor to increase the thickness of the portable display device 100. So as to minimize protrusions of the OLED panel 110 and the integrated circuit 116, a way of reducing a thickness of the portable display device 100 is needed.

SUMMARY OF THE INVENTION

Accordingly, it is an aspect of the present invention to provide a portable display device which minimizes protrusions of a light emitting display panel, such as an Organic Light Emitting Display (OLED) panel, and an integrated circuit to allow the thickness thereof to be reduced.

The foregoing and/or other aspects of the present invention are achieved by providing a portable display device including: a first light emitting display panel; a metal plate arranged on a rear surface of the light emitting display panel; a bottom chassis adapted to receive a second light emitting display panel; and a first printed circuit board arranged between the first light emitting display panel and the bottom chassis; at least a part of either the first light emitting display panel or the metal plate is arranged in opening portions of both the bottom chassis and the first printed circuit board.

At least a part of the metal plate is preferably arranged in the opening portion of the bottom chassis.

The metal plate preferably includes a convex portion and at least a part of the convex portion is preferably arranged in the opening portion of the bottom chassis.

At least a part of the first light emitting display panel is preferably arranged in the opening portion of the first printed circuit board.

The portable display device preferably further includes a second printed circuit board arranged between the first printed circuit board and the bottom chassis.

At least a part of the metal plate is preferably arranged in an opening portion of the second printed circuit board.

The portable display device preferably further includes a flexible printed circuit board arranged on one side of the first light emitting display panel, and an integrated circuit arranged on the flexible printed circuit board and adapted to supply a drive signal to the first light emitting display panel.

The flexible printed circuit board is preferably mounted horizontally, and includes a pad portion arranged on an upper portion of the flexible printed circuit board. The flexible printed circuit board is preferably connected to the first printed circuit board through the pad portion.

A first pad portion is preferably arranged on a rear surface of the first printed circuit board, and is connected to the pad portion of the flexible printed circuit board. The first printed circuit board is preferably adapted to supply a control signal to the flexible printed circuit board.

The integrated circuit is preferably arranged on an upper portion of the flexible printed circuit board. At least a part of the integrated circuit is preferably arranged in the opening portion of the first printed circuit board.

The first light emitting display panel preferably includes an organic light emitting display panel.

The second light emitting display panel preferably includes a liquid crystal display panel and a backlight assembly.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
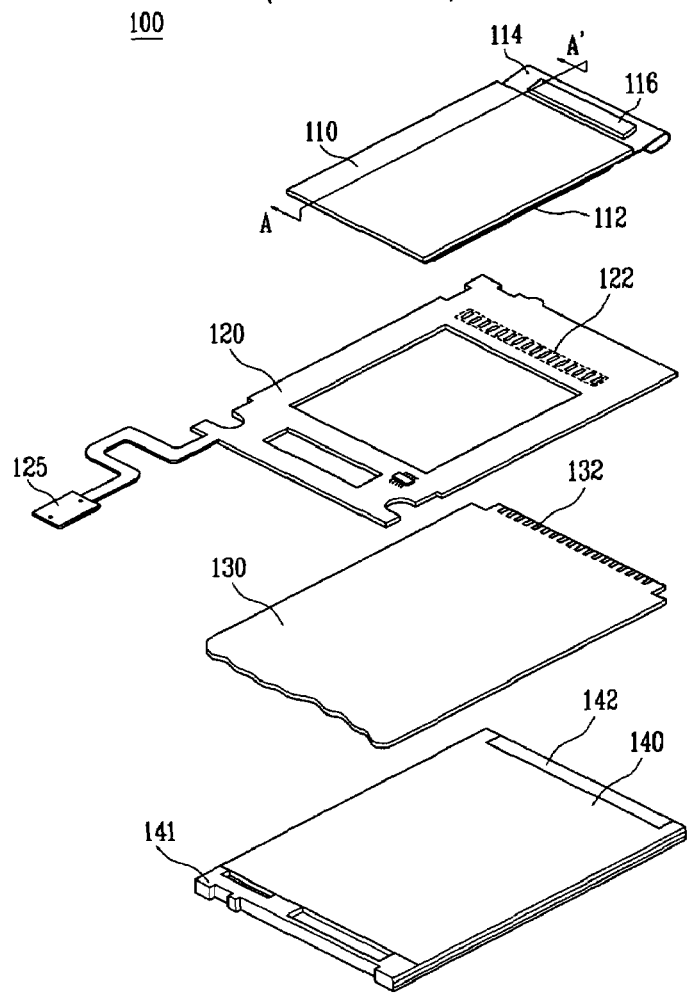
FIG. 1 is an exploded perspective view of a conventional portable display device.
Figure 2:
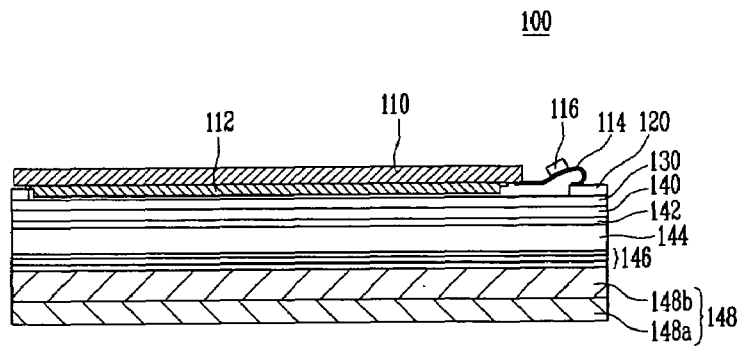
FIG. 2 is a cross-sectional view of the portable display device of FIG. 1 taken along line A-A'.

Hereinafter, an exemplary embodiment of the present invention is described with reference to FIG. 3 and FIG. 4 in which like reference numerals refer to like elements throughout.

Figure 3:
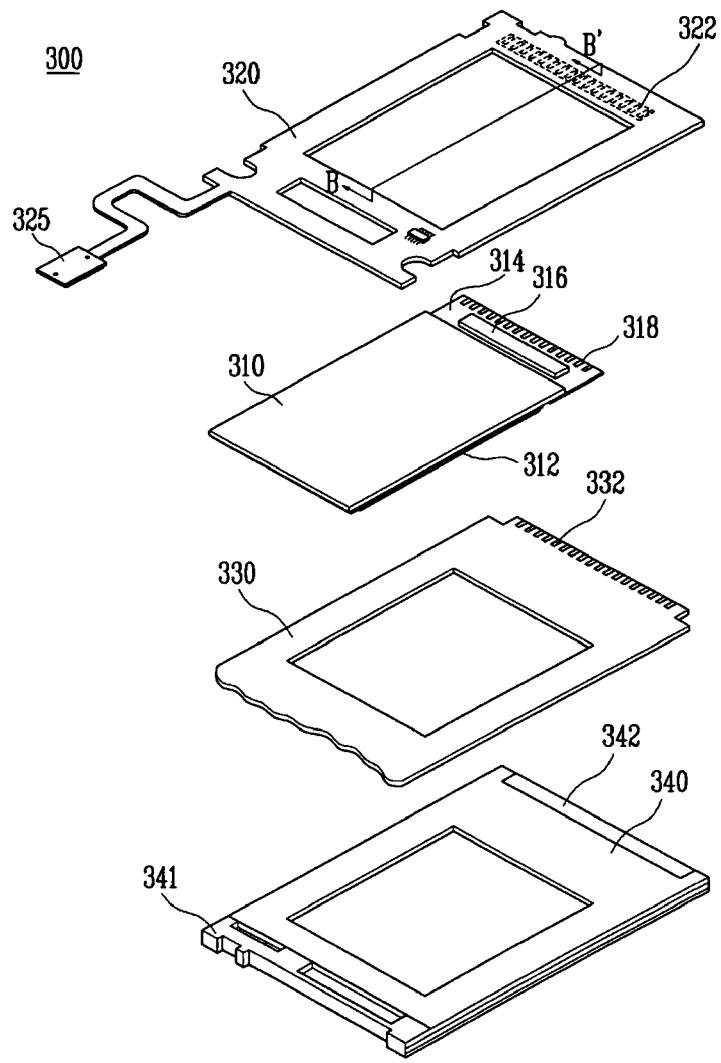
FIG. 3 is an exploded perspective view of a portable display device according to an embodiment of the present invention.

FIG. 3 is an exploded perspective view of a portable display device according to an embodiment of the present invention. FIG. 4 is a cross-sectional view of the portable display device of FIG. 3 taken along line B-B'. Although FIG. 3 and FIG. 4 show a dual type display device including a Liquid Crystal Display (LCD) panel and an Organic Light Emitting Display (OLED) panel, the present invention is not limited thereto.

Figure 4:
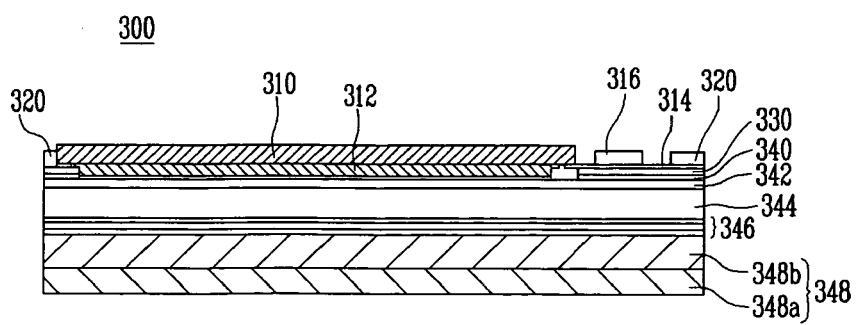
FIG. 4 is a cross-sectional view of the portable display device of FIG. 3 taken along line B-B'.

Referring to FIG. 3 and FIG. 4, the portable display device 300 according an embodiment of the present invention includes an Organic Light Emitting Display (OLED) panel 310, a first printed circuit board 320, a second printed circuit board 330, a Liquid Crystal Display (LDC) panel 348, and a bottom chassis 340 for receiving a backlight assembly. At least parts of the OLED panel 310 and a metal plate 312 are inserted into an opening portion, which is formed at the first printed circuit board 320, the second printed circuit board 330, and the bottom chassis 340.

A plurality of organic light emitting diodes (not shown) are arranged at the organic light emitting display panel 310 in the form of a matrix. The organic light emitting diodes generate light of a predetermined luminance corresponding to a drive signal supplied thereto. In order to supply the drive signal, the flexible printed circuit board 314 is positioned on one side of the OLED panel 310, and the integrated circuit 316 is mounted on an upper portion of the flexible printed circuit board 314.

The flexible printed circuit board 314 receives control signals from the first printed circuit board 320, and transfers them to the integrated circuit 316. To do this, a pad portion 318 formed at an upper portion of the flexible printed circuit board 314 is connected to a first pad portion 322 formed at a rear surface of the first printed circuit board 320 by soldering. The flexible printed circuit board 314 is a laminate structure of at least two materials having different thicknesses. An upper layer of the flexible printed circuit board 314 is generally thinner than a lower layer thereof. When a upper side portion of the flexible printed circuit board 314 having a smaller thickness contacts the first printed circuit board 320 and then soldering is performed, since a stepped portion due to directions of materials is reduced to prevent an occurrence of a bad solder joint. Therefore, the flexible printed circuit board 314 can be mounted horizontally without bending it.

That is, in accordance with the embodiment of the present invention, the flexible printed circuit board 314 is mounted horizontally without being bent. The pad portion 318 formed at an upper portion of the flexible printed circuit board 314 is connected to the first pad portion 322 formed at a rear surface of the first printed circuit board 320. As described earlier, the flexible printed circuit board 314 is mounted horizontally.

When the pad portion 318 of the flexible printed circuit board 314 is connected to the first pad portion 322, control signals generated by the first printed circuit board 320 are transferred to an integrated circuit 316, which is mounted on the flexible printed circuit board 314. Then, the integrated circuit 316 generates and provides drive signals corresponding to the control signals to the OLED panel 310, with the result that the OLED panel 310 displays a predetermined image.

A metal plate 312 is attached to a lower portion of the OLED panel 310, and protects the OLED panel 310 from infiltration of moisture. At least parts of the OLED panel 310 and the metal plate 312 are inserted into opening portions, which are formed in the first and second printed circuit boards 320 and 330, and the bottom chassis 340. For example, at least a part of the OLED panel 310 can be inserted into an opening portion of the first printed circuit board 320, and at least a part of the metal plate 312 can be inserted into opening portions of the second printed circuit board 330 and the bottom chassis 340. Furthermore, the integrated circuit 316 arranged on an upper portion of the flexible printed circuit board 310 is inserted into the opening portion of the first printed circuit board 320 together with the OLED panel 310.

The OLED panel 310 and the metal plate 312 are inserted into the opening portions of the second printed circuit board 330 and the bottom chassis 340 as well as the opening portion of the first printed circuit board 320. Furthermore, the integrated circuit 316 arranged on an upper portion of the flexible printed circuit board 314 is inserted into the opening portion of the first printed circuit board 320. This minimizes the protrusion of the OLED panel 310 and the integrated circuit 316. Owing to this, a total thickness of the portable display device 300 is reduced.

The first printed circuit board 320 receives a drive signal from a drive circuit (not shown) of a portable phone. To do this, the first printed circuit board 320 includes a portable phone connector 325. The portable phone connector 325 mates with another connector attached to a drive circuit of a portable phone, and receives a drive signal from the drive circuit of a portable phone. The first printed circuit board 320, having received the drive signal, generates various control signals corresponding to the drive signal. A first pad portion 322 is formed on a rear surface of the first printed circuit board 320 to be connected to the pad portion 318 of the flexible printed circuit board 314. The OLED panel 310 and the integrated circuit 316 are inserted into an opening portion, which is formed in a predetermined part of the first printed circuit board 320.

The second printed circuit board 330 is connected to the first printed circuit board 320 through the second pad portion 332. Furthermore, the second printed circuit board 330 is connected to an integrated circuit and an organic light emitting diode board (not shown) of the LCD panel 348, having layers 348a and 348b, through a flexible printed circuit board (not shown). The second printed circuit board 330 connected to the integrated circuit and the organic light emitting diode board drives the integrated circuit and the organic light emitting diode board according to the control signals from the first printed circuit board 320. At least a part of the metal plate 312 is inserted in an opening portion, which is formed in a predetermined part of the second printed circuit board 330. For example, when a convex portion is formed in a predetermined portion of the metal plate 312, an opening portion can be formed at the second printed circuit board 330, so that the convex portion of the metal plate 312 can be inserted in the opening portion.

The bottom chassis 340 engages with a molded frame 341 included in a backlight assembly, and receives the LCD panel 348 and the backlight assembly. The LCD panel 348 displays a predetermined image corresponding to a drive signal supplied thereto. The backlight assembly supplies predetermined light to the LCD panel 348 so that the LCD panel 348 can display an image. To do this, the backlight assembly further includes a light emitting diode board (not shown), a reflective plate 342, a light guide plate 344, and optical sheets 346. Light sources, such as light emitting diodes, are mounted on the light emitting diode board. At least a part of the metal plate 312, for example, a convex portion of the metal plate 312 is inserted in an opening portion, which is formed in a predetermined part of the bottom chassis 340 and has a size corresponding to a size of the convex portion of the metal plate 312.

When the aforementioned portable display device 300 according to the embodiment of the present invention is assembled, as shown in FIG. 4, at least a part of the OLED panel 310 is inserted in the opening portion of the first printed circuit 320, and at least a part (for example, convex portion) of the metal plate 312 is inserted in opening portions of the second printed circuit board 330 and the bottom chassis 340. Furthermore, the flexible printed circuit board 314 is mounted horizontally without being bent, and the integrated circuit 316 mounted on an upper portion of the flexible printed circuit board 314 is inserted in the opening portion of the first printed circuit board 320.

The metal plate 312 and the second printed circuit board 330 are attached to each other by using an adhesive member (not shown), such as double-sided tape. For example, the double-sided tape is bonded to a contacting part of remaining parts of the metal plate 312 except for a convex portion thereof with the second printed circuit board 330, thereby bonding the metal plate 312 to the second printed circuit board 330.

In accordance with the portable display device 300 according to the embodiment of the present invention, opening portions are formed at the first and second printed circuit boards 320 and 330, the bottom chassis 304, and at least parts of the OLED panel 310 and the metal plate 312 are inserted in the opening portions. This minimizes the protrusion of the Organic Light Emitting Display panel 310, thereby reducing a total thickness of the portable display device 330. For example, when a thickness of the convex portion of the metal plate 312 is less than or equal to a sum of a thickness of the second printed circuit board 330 and a thickness of the bottom chassis 340, the thickness of the portable display device 300 is reduced by the thickness of the convex portion of the metal plate 312 in comparison with a thickness of the conventional portable display device 100.

Moreover, the integrated circuit 316 for driving the OLED panel 310 mounts the flexible printed circuit board 314 horizontally, and is inserted in an opening portion of the first printed circuit board 320, thereby minimizing the protrusion of the integrated circuit 316.

This reduces a thickness of the portable display device 300 and improves carrying convenience.

As mentioned above, in the portable display device of the present invention, opening portions are formed at first and second printed circuit boards, and a bottom chassis, at least parts of the OLED panel and the metal plate are inserted in the opening portions, so that the protrusion of the OLED panel is minimized. Furthermore, an integrated circuit for driving the Organic Light Emitting Display panel mounts the flexible printed circuit board horizontally. In addition, the integrated circuit is inserted in an opening portion of the first printed circuit board, thereby minimizing the protrusion of the integrated circuit. This reduces a thickness of the portable display device 300 and improves carrying convenience.

Although an exemplary embodiment of the present invention has been shown and described, it would be appreciated by those skilled in the art that modifications to this embodiment can be made without departing from the principles and spirit of the present invention whose scope is defined by the following claims.

What is claimed is:

1. A portable display device comprising:
    a first light emitting display panel having a front surface and a rear surface;
    a metal plate arranged on the rear surface of the first light emitting display panel;
    a bottom chassis having opening portions and adapted to receive a second light emitting display panel; and
    a first printed circuit board having opening portions and arranged between the first light emitting display panel and the bottom chassis;
    wherein at least a part of either the first light emitting display panel or the metal plate is arranged in the opening portions of both the bottom chassis and the first printed circuit board.

2. The portable display device according to claim 1, wherein at least a part of the metal plate is arranged in one of the opening portions of the bottom chassis.

3. The portable display device according to claim 2, wherein the metal plate includes a convex portion and wherein at least a part of the convex portion is arranged in one of the opening portions of the bottom chassis.

4. The portable display device according to claim 1, wherein at least a part of the first light emitting display panel is arranged in one of the opening portions of the first printed circuit board.

5. The portable display device according to claim 1, further comprising a second printed circuit board having opening portions and arranged between the first printed circuit board and the bottom chassis.

6. The portable display device according to claim 5, wherein at least a part of the metal plate is arranged in the opening portion of the second printed circuit board.

7. The portable display device according to claim 1, further comprising a flexible printed circuit board arranged on one side of the first light emitting display panel, and an integrated circuit arranged on the flexible printed circuit board and adapted to supply a drive signal to the first light emitting display panel.

8. The portable display device according to claim 7, wherein the flexible printed circuit board is mounted horizontally, and includes a pad portion arranged on an upper portion of the flexible printed circuit board.

9. The portable display device according to claim 8, wherein the flexible printed circuit board is connected to the first printed circuit board through the pad portion.

10. The portable display device according to claim 9, wherein a first pad portion is arranged on a rear surface of the first printed circuit board, and is connected to the pad portion of the flexible printed circuit board.

11. The portable display device according to claim 10, wherein the first printed circuit board is adapted to supply a control signal to the flexible printed circuit board.

12. The portable display device according to claim 7, wherein the integrated circuit is arranged on an upper portion of the flexible printed circuit board.

13. The portable display device according to claim 12, wherein at least a part of the integrated circuit is arranged in one of the opening portions of the first printed circuit board.

14. The portable display device according to claim 1, wherein the first light emitting display panel comprises an organic light emitting display panel.

15. The portable display device according to claim 1, wherein the second light emitting display panel comprises a liquid crystal display panel and a backlight assembly.

16. The portable display device according to claim 2, wherein the first light emitting display panel comprises an organic light emitting display panel.

17. The portable display device according to claim 2, the second light emitting display panel comprises a liquid crystal display panel and a backlight assembly.

18. The portable display device according to claim 3, wherein the first light emitting display panel comprises an organic light emitting display panel.

19. The portable display device according to claim 3, the second light emitting display panel comprises a liquid crystal display panel and a backlight assembly.

20. The portable display device according to claim 4, wherein the first light emitting display panel comprises an organic light emitting display panel.

21. The portable display device according to claim 4, the second light emitting display panel comprises a liquid crystal display panel and a backlight assembly.

* * * * *